Patented June 12, 1934

1,962,153

UNITED STATES PATENT OFFICE 1,962,153

FRACTIONAL DISTILLATION

Albert G. Peterkin, Jr., Bryn Mawr, Pa., assignor to The Atlantic Refining Company, Philadelphia, Pa., a corporation of Pennsylvania Application June 18, 1931, Serial No. 545,224

6 Claims. (Cl. 196—94)

The present invention relates to improvements in fractional distillation, more particularly, to improvements in that type of fractional distillation which involves rapidly heating the composite liquid to be separated into fractions, to a temperature at which substantial amounts thereof will be changed to the vapor state, as for example, by passing a liquid in a continuous stream and at a rapid rate through a pipe still or equivalent heating means, thereafter separating the portion which has been changed to vapors as a result of the heating step, from the portion which remains liquid after such step, then separating the vapors into fractions of desired boiling ranges, for example, by passing them through a fractionating column of the bubble plate or equivalent plate type, wherein they are brought into contact with a series of pools of liquid, to effect separation and deposition in each of the pools of those components of the vapors of substantially the character of the liquid in each such pool.

After the initial separating step in fractional distillation of the type aforesaid, in which the bulk of the portion which remains liquid after the heating step separates from the portion which has been changed to vapors as a result of such step, there remains entrained in the vapors in a finely divided state, considerable of the unvaporized portion, which, if allowed to be carried by the vapors into the first and subsequent pools of liquid with which they come into contact, will deposit in such pools and contaminate them, and particularly the first pool, to deleterious extent. When liquid is withdrawn from the first and subsequent pools, under operating conditions as last aforesaid, supplementary treatment of the liquid, as for example, by means of chemicals, such as sulfuric acid in the case of hydrocarbon oils, is required to bring the liquid to a desired standard of purity, of which, in hydrocarbon oils, color, stability and boiling range are criteria.

Heretofore, when operating as outlined above, numerous suggestions have been made of procedure whereby this deleterious amount of the unvaporized portion entrained in the vapors may be removed therefrom. For example, it has been suggested that the vapors be passed through a plurality of baffle sections, such as shown in Patent No. 1,748,704. Other suggestions have been that the vapors be passed through beds of material such as broken rock, tile, or metal turnings, for example, employed as shown in Patent No. 1,723,748. However, none of the practices heretofore suggested, in a system in which fractional distillation comprising the heating step and separating steps as aforesaid may be carried out, effects removal such as is obtained by my invention.

The type of entrainment above referred to is to be distinguished from entrainment resulting from passage of vapors through pools of liquid in a fractionating column. In the former the liquid entrained in the vapors is in the form of very minute or mist-like particles, because of which the entrainment is of considerably more persistent nature or more difficult to remove than in the case of the latter type. While my invention is especially and particularly adapted for the removal of entrainment of the former type, it is to be understood that its adaptation to the removal of the latter type is within the scope thereof. Besides, the type of entrainment which I particularly contemplate removing from vapors is different in kind from the type of entrainment occurring in vapors produced by heating liquid in a still of the character of the well known drum still, in which a body of the liquid, which fills approximately half of the space within a closed shell, is at least in part vaporized by transmitting heat thereto through the wall of the shell in which the liquid body is contained. In the type of operation last mentioned, there is no entrainment of the character of that incident to pipe still operation. In pipe still operation, in which a restricted stream of the liquid to be distilled is rapidly passed through the heating zone, probably due to the high velocity of travel of the stream and the rapid application of heat thereto, there actually results in the vapors formed entrainment of liquid in the form of very finely divided particles, mist-like in character, which are peculiarly persistent in their tendency to remain entrained, and whose rate of settling is extremely slow; and for this reason the entrained liquid, or at least a great part of it, after the pipe still heating step, even when mist extracting means heretofore used are employed, is carried by the vapors into that portion of the system in which the vapors are to be separated into fractions. Since there is no restricted flowing stream in drum still operation, and since the rapidity with which heat is applied to the liquid, and consequently the rapidity with which the vapors are formed in such operation, is of an entirely different and lower order from that in pipe still operation, it is readily apparent that the problems of removing entrainment in these two types of operations are radially different.

In pipe still operation, upon initial passage of the heated vapor-liquid stream from the pipe still into that part of the system wherein the vaporized portion is separated from the portion which remains liquid, since the stream is introduced from a passage of relatively small cross-sectional area into a chamber of relatively large cross-sectional area and volume, there is a rapid pressure drop and sudden increase in volume, particularly of the vapors. This condition tends further to distribute and maintain the entrained mist-like particles of liquid in the vapors.

Further, as a matter of considerable practical importance in operation and as an illustration of the difference between the handling of pipe still or equivalent vapors, on the one hand, and the handling of batch still vapors on the other, it is significant that batch still equipment has a much lower capacity than pipe still equipment; that is, the velocity of vapors issuing from a batch still does not at all compare with the high velocity of vapors at the outlet of a pipe still. In batch still operation both the area and volume from which the vapors disengage are large and the rate of distillation small as compared with such factors in present day pipe still operation. Because of this fact, the entrainment of liquid in vapors, as the heated mixture from the pipe still is initially separated into vapors and liquid, is of a different and much higher order than that which can possibly occur in batch still operation.

My invention will be described and explained with particular reference to the farctional distillation of hydrocarbon oils, and more particularly, to the fractional distillation of crude petroleum. It is to be understood, however, that my invention is not limited to processes and/or apparatus for the fractional distillation of these specific materials, but that the principles are of advantage in the fractional distillation of substantially any composite liquid, when such fractional distillation includes the steps of heating and separation hereinabove referred to, and when there are presented problems which in a relatively broad sense are similar to those encountered in fractional distillation of the specific materials aforesaid. Further, while the present description refers in particular to the removal of entrained liquid to improve the purity of oil, particularly from the standpoint of color reduction, it is to be understood that it is immaterial whether or not the entrained material has color imparting characteristics. My invention is applicable regardless of the particular undesirable effect caused by the entrained material, whether it be gum-forming, catalytic in character, promoting decomposition of the liquid being distilled, or have other patent or obscure harmful effect.

Heretofore, the problem of removing entrained material from vapors has been approached from an entirely different angle from that from which it is approached in accordance with my invention. In the past, those concerned with problems of deentrainment have used as a measure of the degree of success and efficiency, the effect on the boiling range of a pool of liquid in a fractionating zone of a column, due to the passage of vapors therethrough. As a means of determining the effect upon the boiling range of the liquid in such zone (and hence the efficiency of deentrainment) a laboratory assay distillation was carried out. While the assay distillation is a good measure of column fractionating efficiency, it is wholly inadequate to indicate very small portions of material which boil entirely outside of the range of the major portion of the liquid. For example, the presence of two-tenths of 1% of very heavy lubricating oil in mixture with gasoline could not be discerned by assay distillation procedures in common use; and analogously, a like amount of heavy black oil, carried as entrainment and deposited in one of the lighter fractions midway or toward the top of the fractionating column, would not be discernable by an assay distillation test, and yet would be very harmful from the aspect of the high discoloration of the light oil caused by the small amount of black oil. It is therefore plain that in determining small amounts of extraneous color-imparting material, results assumed to have been accomplished are meaningless, due to the insufficiency of the assay distillation for making such determinations.

One of the most rigid requirements in connection with the production of lubricating oils is that the finished material shall have a certain specified light yellow or red color. To arrive at these specified colors, expensive procedures, such as treatment of distillates with relatively large quantities of sulphuric acid or filtering through or in contact with highly adsorbent materials, etc. are employed. The presence of increased small percentages of heavy, highly-colored materials has been found to require economically important increased amounts of sulphuric acid or absorbents to remove the color imparted by the small percentage of the heavy materials which likely are asphaltic in character.

As shown by H. M. Weir and others in an article entitled "The acid treatment of lubricating distillates", Industrial and Engineering Chemistry, distillates", Industrial Engineering Chemistry, Vol. 22, 1930, the effectiveness of a given weight of acid in producing the desired light colored lubricants is conditioned in large part upon the initial color of the distillate. The fact that there is a variation in color or color intensity of the black oil in certain of the fractionating zones of a column used to separate vapors from a pipe still has, in the past, been overlooked, but in accordance with my invention is employed as one means for measuring deentraining efficiency. The measure of greatest significance, however, is the amount of acid or other reagent subsequently necessary to remove the color constituents from the distillate.

Previous inventors have described procedures which remove some of the contamination of spray entrainment in practical fractional distillation, and in some instances the removal is sufficiently effective, so that, from the standpoint of the aforesaid inadequate assay distillation analysis, it appears, though in fact is not, complete. In view of the foregoing, it will be understood that by my invention, as contrasted with results of prior procedure, there is accomplished such effective deentrainment that the quantity of reagent subsequently necessary to bring the color, in the case of oil to a predetermined standard, is a minimum.

Accordingly, I am more particularly concerned with removal of entrained liquid from vapors, particularly the liquid entrained as a result of formation of the vapors by heating the composite liquid in a pipe still or equivalent heating means, to an extent such that when the vapors pass to and through the first and succeeding pools of liquid in a fractionating column, no substantial increase in color or other effect of or upon the liquid in such pools, or at least no increase of the order of that which takes place in the operation of systems heretofore known, is caused by deposition in the pools of entrained material carried by the vapors.

I have found that if in pipe still or equivalent fractional distillation, there be employed in addition to and/or in lieu of the means heretofore employed for the removal of entrained liquid or mist from vapors, a matted body or bed of material, preferably geometrically defined, composed of strands or fibers intimately commingled into a more or less compact filamentous or filamentary mass, such that a minimum bulk is presented for a maximum surface of contact with a maximum amount of open space or voids, uniquely valuable removal of entrained liquid or mist from vapors, to be or being separated into fractions, is possible. Examples of the types or kinds of materials utilizable in accordance with my invention are metallic wools, such as steel wool, copper or bronze wool, etc., which if necessary or desirable may be galvanized, plated or otherwise coated or treated to render the material resistant to any corrosive or deteriorating effect by the vapors or their content, or to prevent effect upon the vapors or their content, and/or to bond the fibers into an integral structure which will retain its shape and arrangement, while maintaining its high percentage of voids or free space with maximum exposed surface, under the severest conditions of use, and in addition, to prevent matting down or caking. Nonmetallic wools, such as mineral wool, glass wool, slag wool, carbon wool, etc., which have characteristics such as above stated, and/or the various other types of material having like characteristics, may be employed.

The percentage of voids in the materials which are employed in accordance with my invention, is of a higher order than that of means heretofore used for removal of entrained liquid from vapors undergoing fractional distillation in a pipe still distillation system. I find that materials of the character aforesaid have voids of the order of 93%, and often have voids to the extent of from about 94% to about 96%, and sometimes even to the extent of 99.4%.

Among the important characteristics of the material which I employ in my pipe still distillation for removal of entrained liquid from vapors, are: (1) exposure of very large surface in the path of the vapors; and (2) high percentage of voids. By reason of the first of these, the possibility of mist particles becoming attached to the material is great, and because of the second the velocity of the vapors in passing through the material is not materially higher than if and when the material were absent. Under these conditions a mist droplet precipitated at one instant on a fiber or filament is not the next instant swept off into the vapor stream, but clings tenaciously to the fiber and flows back against the vapor stream. In the course of its downward flow the volume of the removed liquid is augmented by other mist droplets, which likewise are snared by the filamentous material until droplets of sufficient size form at the base of the layer of material, and fall by gravity through the rising stream of vapors.

For a better understanding of my process, and in order to illustrate structure coming within the scope of my invention, reference is had to the accompanying drawings, in which.

Figure 1:
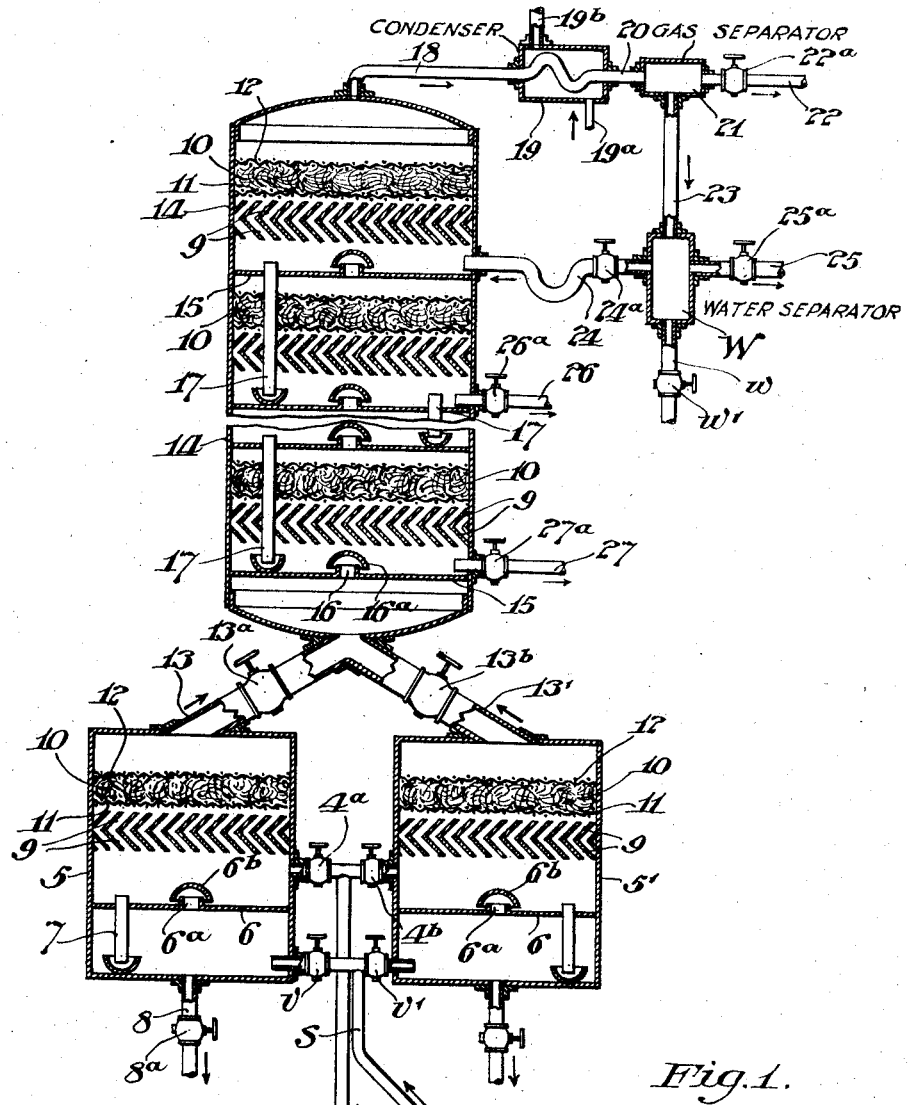
Fig. 1 is a diagrammatic elevational view in section of a system, including a pipe still, in which continuous fractional distillation may be carried out.

Referring to Fig. 1, P represents a pipe or tube still of any conventional or suitable type, having the tube structure T heated by fuel delivered to burner structure 1; products of combustion pass to stack through duct D. The liquid to be distilled is delivered to tube structure T through pipe 2 by pump 3. The liquid after having been raised to the desired temperature is conducted from the tube structure T through pipe 4 into one of the separating chambers 5 or 5' through valve 4a or 4b respectively. The separating chambers are substantially identical in structure so that the description of one will suffice for both. The oil is introduced onto plate 6 in the chamber 5, whereupon the portion thereof which has been changed to the vapor state passes upwardly, and the liquid collects in a pool upon the plate, to a level determined by the uppermost portion of the downflow pipe 7. The excess liquid from the pool upon plate 6 passes to the lower part of the chamber through pipe 7, thence from the bottom of the chamber through the outlet pipe 8 controlled by valve 8a. Steam may be passed into the liquid which collects in the lower part of chamber 5, in order to strip such liquid of its lower boiling components, and steam pipe S controlled by valves $v$ and $v'$ is tapped into chambers 5 and 5' for such purpose. Vapors so liberated by the steam pass upwardly through vapor uptakes 6a and are deflected by means of bubbler caps 6b into the pool of liquid upon plate 6.

The vapors in passing upwardly through the chamber 5 first come into contact with baffles 9 which serve to remove some of the liquid entrained in the vapors. However, small portions of entrained liquid remain in the vapors even after passage through the baffles 9, which may be of one or another of the types heretofore well known and used for the removal of entrained liquid from vapors undergoing fractional distillation.

After contacting with the baffles 9, the vapors pass through a body or bed 10 composed of strands or fibers intimately commingled into a more or less compact filamentous mass, for example, steel wool. The body 10 is supported within the chamber 5 upon a support 11 which may be a wire screen, perforated plate, sheet of expanded metal lath, chicken wire, or other suitable or similar material having a great amount of open space. In fact, the bed of material 10 may be laid directly on top of the baffles 9, the latter serving as a supporting means therefor. In order to hold the bed of material in place within the chamber, a member 12 similar to support 11, or other suitable means, is placed upon the top of the bed. Each of the members 11 and 12 may be affixed at its periphery to the walls of the chamber 5.

The vapors in passing through the bed of material 10 intimately contact with the great amount of surface exposed, whereupon the small portions of mist or entrained liquid in the vapors are removed therefrom, permitting the vapors to pass to the fractionating portion of the system in a substantially dryer condition and considerably more free of contaminating entrainment than if such vapors had not been passed through a mass, body or bed 10 of the character described. While it is preferred that both baffle or equivalent structure 9 and material 10 be used, structure 9 may be omitted.

After contacting with the several mist extracting means, the vapors are conducted from the chamber 5 through the large connecting pipe 13, controlled by valve 13a, to fractionating column 14 which is equipped with bubble plates 15 which have suitable number of vapor uptakes 16 covered by suitable caps 16a. All of the plates 15 except the lowermost have liquid overflow pipe 17. Upon entering the column 14, the vapors first pass through vapor uptakes 16 in the lowermost plate 15, and are directed through the pool of liquid thereupon by means of the bubble caps 16a over the uptakes 16, to effect separation of constituents contained in the vapors of substantially the composition of those contained in the liquid upon the plate. After passage through the liquid upon the lowermost plate, the vapors continue upwardly through the column, passing through mist extracting means or baffles 9 and then through steel wool 10 or equivalent, as referred to in connection with chamber 5. The mist extracting means 9 and/or 10 serve to remove portions of liquid entrained by the vapors in passing through the pool of liquid upon the lowermost fractionating plate 15. Thus the vapors pass to the fractionating plate 15 next above in a substantially liquid-free condition.

Mist-extracting means 10 of the character indicated may be placed in the vapor space above each of the succeeding fractionating plates 15 in the fractionating column, for the purpose aforesaid. It is to be understood that such means may be placed in a fractionating column, below the lowermost plate in the column, between plates therein, and/or above the uppermost plate; and either alone or in association, as illustrated, with baffles or the other type of mist extractor 9.

Those vapors which do not condense upon coming into contact with one or more of the pools of liquid within the column 14 are conducted from the uppermost portion of the column through line 18 to condenser 19 in which they are changed to the liquid phase by passage into indirect contact and heat exchange relation with a suitable cooling medium entering at 19a and discharged at 19b. From the condenser 19 the condensate, with any gases contained in the material charged to the system and/or formed during its passage therethrough, passes through pipe 20 into gas separator 21, in which the gases separate from the liquid and pass through line 22, controlled by valve 22a, to suitable storage, not shown. Of the gas-free liquid passing from the separator 21 through line 23, a portion thereof is returned to the upper part of the fractionating column through line 24, controlled by valve 24a, and the remainder of the liquid is passed through line 25, controlled by valve 25a, to suitable liquid storage, not shown. When steam is introduced into the system, as above described, the pipe 23 may deliver into the water separator W to which the aforesaid pipes 24 and 25 are connected, and which is provided with a water drawoff pipe $w$ controlled by valve $w_1$.

At suitable levels in the fractionating column, there are provided lines 26, controlled by valves 26a, so that liquid fractions may be withdrawn from certain pools. At a level just above the lowermost plate 15 in the fractionating column is tapped a line 27, controlled by valve 27a, through which excess liquid may be withdrawn, and in the structural arrangement shown, line 27 is the only means by which liquid may be conducted from that plate.

It will be understood that separators 5 and 5' are provided as a matter of convenience, so that one may be used while the other is being cleaned or renovated. It will be further understood that these separators may be integral with the fractionating column, if desired, or in fact, that only one separator, which may be incorporated with or in the fractionating column at its lower part, may be employed. Various modifications within the spirit and scope of my invention will suggest themselves to those skilled in the art.

Figures 2, 3:
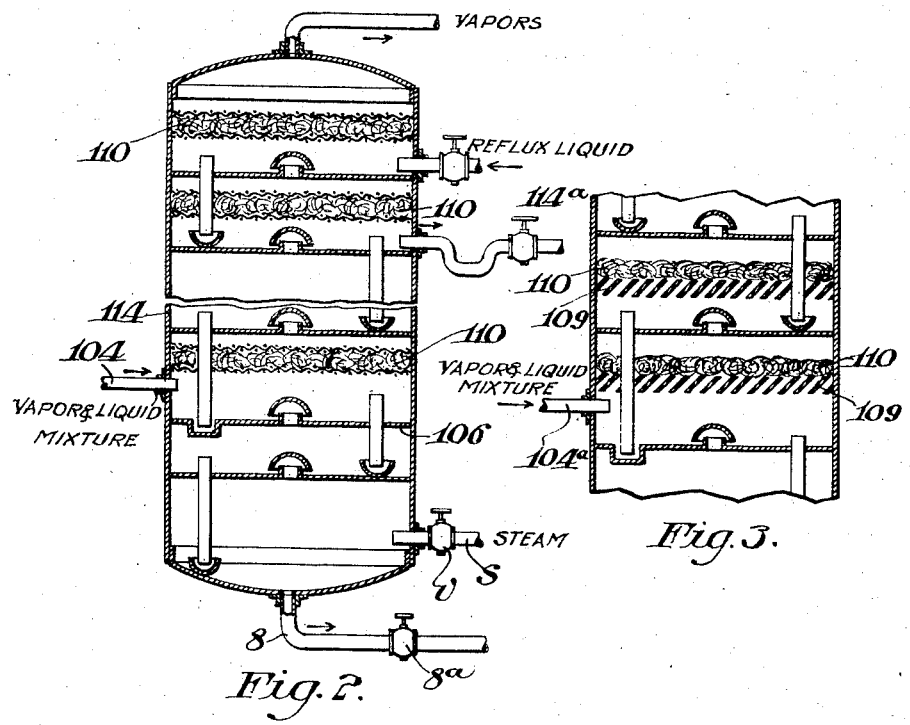
Fig. 2 is a diagrammatic elevational view in section of a modification of a portion of the apparatus shown in Fig. 1.
Figs. 3 and 4 are further modifications of a portion of such apparatus.
Figure 4:
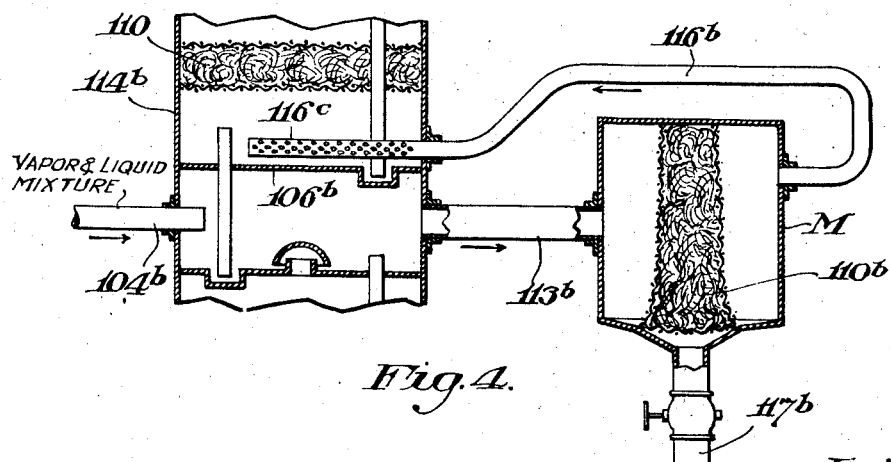

Figs. 2 to 4 inclusive are illustrative of three additional modifications of my invention. In Fig. 2, the lower part of the fractionating column is used as the separator in which both the bulk of the unvaporized portion of the material from the pipe still and the entrained liquid particles or mist are separated from the vaporized portion. The mixture from the pipe still is introduced into the column 114 through line 104. The bulk of the liquid portion separates from the vaporized portion of the mixture and drops down onto plate 106, while the vapors pass upwardly, first coming into contact with the body or bed of fibrous material 110, such as steel or equivalent, which causes substantially complete deentrainment or removal from the vapors of entrained particles of liquid or mist. Liquid draw-off 8 and steam line S are provided as before.

The modification shown in Fig. 3 is similar to that shown in Fig. 2, with the addition of a row of baffles 109, below the body of fibrous material 110, such row of baffles to effect, as in Fig. 1, a rough removal of entrained liquid from the vapors before they come into contact with the body of filamentous material, which is more efficient than the baffles, and substantially completely removes the remainder of the entrained liquid from the vapors.

In the further adaptation of the invention, disclosed in Fig. 4, the mixture from the pipe still is introduced through the line 104b into the separating section of column 114b, in which the bulk of the portion coming from the pipe still as liquid is removed from admixture with the vaporized portion and collects on the first plate below the inlet. The vapors then pass from the column through line 113b into mist extracting chamber M, across which is disposed in any suitable manner so that all of the vapors must pass therethrough, a body or mass of the fibrous mist-extracting material 110b. After passage thru the mass of material 110b the vapors are conducted back to the fractionating section of column 114b through line 116b, which has a perforated portion 116c that extends into the liquid on plate 106b in the column, so that the vapors may be bubbled through such liquid. From the lower part of chamber M there may be withdrawn through valve controlled line 117b, the liquid removed from the vapors in said chamber.

Otherwise, the systems in which the modifications disclosed in Figs. 2, 3, and 4 are to be incorporated are, in a broad sense, similar to the system disclosed in Fig. 1.

While in Fig. 1 and Fig. 3, two types of mist-extracting means are shown, no claim is made herein to the one of baffle type per se. The baffles are shown for the purpose of illustrating that means heretofore known may be supplemented by the particular mist-extracting means which forms a part of my invention, namely, the body or bed of material, for example, steel wool or equivalent, composed of strands or fibers intimately commingled into a more or less compact filamentous mass. However, it is to be understood that my new mist-extractor may be used without employing mist-extracting means heretofore known, to effect results superior to those accomplished by utilization of means disclosed in the prior art.

I particularly call attention to the fact that while my mist-extracting means is more efficient than means heretofore employed in fractional distillation systems, it nevertheless entails no substantial increase in velocity of the vapors in passage therethrough, and causes no substantial pressure drop over that incident to utilization of the fractionating system prior to incorporation therein of such means.

I am aware of a large number of the types of mist-extracting means which have been used in fractional distillation systems heretofore, including employment, for the separation of mist from vapors, of louvers, baffle plates, inert ceramic material, and metal turnings. However, none of these means or materials when employed in a fractional distillation system will effect separation of mist from vapors to an extent of the order of that to which the body or bed of material which I employ effects such separation. This may be attributed, among other things, to the fact that means heretofore employed for such purpose do not contain void space per unit bulk of the order of the void space which occurs in material which I employ.

It is within the contemplation of my invention to employ my mist-extracting means in fractionating systems operated under atmospheric pressure or under pressure greater or less than atmospheric pressure. The employment of my mist-extracting means in a fractionating system permits or results in an increase in the fractionating capacity of the system, since it allows the employment of higher velocities in passage of vapors through the system without harmful effect upon the fractions separated, due to contamination.

Specific data resulting from actual runs made are given below, more clearly to set forth the merits of my invention. The data were obtained from runs made in connection with the distillation of petroleum and are given by way of example, without limiting the scope of my invention.

In the operation of a fractional distillation system comprising a pipe still connected with a fractionating column of the bubble plate type, in which distillation of a topped or reduced Spindletop crude was separated into fractions, absolute pressure of approximately 15 m. m. of mercury being maintained upon the system, a bed of steel wool eight inches thick was inserted in the vapor space above the inlet to the fractionating column and below the pool of liquid next above the inlet; effective baffle or like structure 9 was not employed. It was found that upon operating under these conditions, the color of the stream taken from the aforesaid pool decreased to 58% of the color of the same stream when the bed of wool was not used. In other words, steel wool in the column brought about a color reduction of 42%. The bed of material caused a negligible pressure drop, of the order of only 4 m. m. of mercury. The colors of the respective oil fractions above referred to were taken using the color scale set forth in the article by Weir et al previously referred to. In this color scale the color units are directly proportional to the actual amount or intensity of color in the oil. As set forth in that article, the acid required to remove color from an oil is in general proportional to the percentage of the color it is desired to remove. Therefore, it will be seen that a 42% improvement in color as effected by the steel wool represents a very substantial saving in acid and a substantially reduction in loss of oil attendant upon acid treatment.

In another set of runs in which a Mid-Continent crude was subjected to fractional distillation under atmospheric pressure in a system comprising a pipe still connected at its outlet end to a fractionating column of the bubble plate type, it was found that by interposing only a bed of steel wool eight inches thick, without effective baffle or equivalent structure 9, in the vapor space above the inlet to the column, but below the first plate above said inlet, the color of the stream taken from the first plate above the inlet was thereby decreased to 11% of the color of the same stream when the bed of steel wool was not employed. The steel wool caused a pressure drop of only one-tenth of a pound.

Such results as obtained in the above-mentioned runs, employing steel wool, could not even be approached when mist extractors, such as inclined baffles, were substituted in lieu of the bed of steel wool.

I have found that the thickness of the bed of filamentous material may be varied, as for example, between 4 inches and 12 inches, with approximately equal results, for vapor velocities over a relatively wide range, as for example, from 2.5 feet per second in an atmospheric column to 27 feet per second in a vacuum column.

Such data as given above serve to characterize the practical significance arising from the unique results accomplished by my invention, and are to be taken as a representative measure of the utility of the invention.

As pointed out above, control of color in petroleum refining practice is primarily associated with lubricating oils. The fractions of petroleum herein contemplated by the expression "lubricating oils" have a viscosity of from about 50 seconds Saybolt universal at 100° F. to about 300 seconds Saybolt universal at 210° F.

Oils having a viscosity of 65 seconds Saybolt universal at 210° F. have been taken from a fractionating column after having passed through a mass of filamentary material, as herein disclosed, which have shown a true color below 400, measured in accordance with the method disclosed by H. M. Weir and others in the article hereinbefore referred to. Also lubricating oils of a viscosity of approximately 250 seconds Saybolt universal at 210° F. have been obtained from similar apparatus, which show a true color below 1500. The oil fractions just referred to were obtained by the distillation of a reduced Mid-Continent crude. Corresponding fractions from a Pennsylvania crude run in the same manner may reasonably be expected to have a color even better than the fractions from the reduced Mid-Continent crude.

Likewise, by the practice of my invention, there have been obtained, in the distillation of Mid-Continent crude, fractions having viscosities of 100, 135, 165, and 200 seconds Saybolt universal at 210° F. whose true colors were below 700, 900, 1100, and 1300 respectively.

In all the foregoing, and in general, in accordance with my invention, the color, in the case of oil, is greatly improved without loss of oil, and subsequent acid treatment, if resorted to, requires far less acid, and entails less loss of oil.

When in the appended claims, the term "heat resistant material" is employed, it is to be understood to mean material which will withstand the heat to which it is subjected during the operation, without undergoing deterioration to substantial extent.

What I claim is:

1. In a continuous process for separating hydrocarbon oils into fractions, the steps which comprise passing the oil at high velocity in an elongated confined stream of restricted cross-sectional area through a heating zone to vaporize a portion thereof, allowing the bulk of the unvaporized oil to separate from the resultant rapidly moving vapors, and continuously passing the resultant vapors at high velocity through a body of heat resistant material composed of strands and fibers intimately commingled into a compact filamentous mass having void space of the order of 93% and upwards, thereby to efficiently free the vapors of liquid entrained therein.

2. In a continuous process for separating hydrocarbon oils into fractions, the steps which comprise passing the oil at high velocity in an elongated confined stream of restricted cross-sectional area through a heating zone to vaporize a portion thereof, allowing the bulk of the unvaporized oil to separate from the resultant rapidly moving vapors, passing the resultant vapors at high velocity through a body of heat resistant material composed of strands and fibers intimately commingled into a compact filamentous mass having void space of the order of 93% and upwards, thereby to efficiently free the vapors of a large part of the liquid entrained therein, and introducing the resultant high velocity vapors into a fractionating zone through which the vapor velocity is of substantially the same order as through the aforesaid body, and from which a side stream fraction composed of high boiling components of said vapors is withdrawn, the resultant side stream fraction having a high degree of freedom from materials carried over by entrainment.

3. In a continuous process for producing from crude petroleum a light colored distillate fraction of from about 65 to about 250 seconds Saybolt universal viscosity at 210° F., the steps which comprise passing the crude petroleum at high velocity in an elongated confined stream of restricted cross-sectional area through a heating zone to vaporize a portion thereof, allowing the bulk of the unvaporized petroleum to separate from the resultant rapidly moving vapors, passing the resultant vapors at high velocity through a body of heat resistant material composed of strands and fibres having void space of the order of 93% and upwards, thereby to efficiently free the vapors of substantial of the liquid entrained therein, and introducing the resultant high velocity vapors into a fractionating zone, through which the vapor velocity is of the same order as through the aforesaid body, and from which a side stream fraction composed of higher boiling components of said vapors is withdrawn, said fraction having a high degree of freedom from entrained material and constituting the light colored distillate aforesaid.

4. In a continuous process for producing from crude petroleum a distillate fraction having a viscosity of from about 65 to about 100 seconds Saybolt universal at 210° F., and a true color without additional refinement of not more than 700, the steps which comprise passing the crude petroleum at high velocity in an elongated confined stream of restricted cross-sectional area through a heating zone to vaporize a portion thereof, allowing the bulk of the unvaporized petroleum to separate from the resultant rapidly moving vapors, passing the resultant vapors at high velocity through a body composed of steel wool intimately commingled into a compact filamentous mass having upwards of substantially 93% voids, thereby to efficiently free the vapors of substantial of the liquid entrained therein, and continuously introducing the resultant high velocity vapors into a fractionating zone, through which the vapor velocity is of substantially the same order as through the aforesaid body, and from which a side stream fraction composed of higher boiling components of said vapors is withdrawn, said fraction having a high degree of freedom from entrained material and constituting the light colored distillate aforesaid.

5. Apparatus for continuously and efficiently producing from hydrocarbon oils, distillate fractions which have a high degree of freedom from entrained heavy material, which comprises a pipe still, means for rapidly forcing oil therethrough, a fractionating column, a conduit leading from said pipe still to said fractionating column, and a body composed of strands and fibers intimately commingled into a compact filamentous mass having upwards of substantially 93% voids interposed in the circuit of vapors passing from said pipe still through said fractionating column, said body being so interposed that the velocity of vapors therethrough is of substantially the same order as the velocity of vapors through said fractionating column and so that said body is substantially out of any portion of the system wherein pools of liquid form.

6. Apparatus for continuously and efficiently producing from hydrocarbon oils, distillate fractions which have a high degree of freedom from entrained heavy material, which comprises a pipe still, means for rapidly forcing oil therethrough, a fractionating column containing a plurality of fractionating chambers, a conduit leading from said pipe still to said fractionating column, and at least one body composed of strands and fibers intimately commingled into a compact filamentous mass having upwards of substantially 93% voids interposed in the circuit of vapors passing from said pipe still through said fractionating column, said body being located in circuit at least below the first fractionating chamber above the point of introduction of vapors into said column and being substantially out of the portion of the column wherein pools of liquid form.

ALBERT G. PETERKIN, Jr.